Patented Sept. 12, 1933

1,926,106

UNITED STATES PATENT OFFICE 1,926,106

DYESTUFF AND METHOD OF MAKING THE SAME

George W. Miles, Boston, Mass., assignor to Celanese Corporation of America, a corporation of Delaware No Drawing. Application March 19, 1930
Serial No. 437,276

7 Claims. (Cl. 8—6)

This invention relates to the preparation of colloidal suspensions or solutions, and relates more particularly to the dispersion of relatively water insoluble coloring matters or dyestuffs by the use of a novel colloiding agent.

An object of my invention is to prepare colloidal solutions or suspensions that have a high degree of dispersion. A further object of my invention is to prepare a dispersion of relatively water insoluble coloring matter capable of coloring organic derivatives of cellulose by the use of an extract of straw. Further objects of my invention will appear from the following detailed description.

I have found that if straw is extracted with water or other extracting liquid, the resulting extract is an excellent dispersing agent for the preparation of colloidal solutions or suspensions of solid materials. While this straw extract is of general application for the preparation of dispersions of all kinds, it is particularly useful in the preparation of dispersions of water insoluble coloring compounds capable of dyeing cellulose acetate or other organic derivatives of cellulose.

In accordance with my invention, I prepare an extract of straw and employ such straw extract, with or without other dispersing agents, to disperse finely divided solids.

Any suitable straw may be employed for making the extract, examples of which are rye, wheat and rice straw. Other straws may also be employed, and the term "straw" includes similar materials such as grasses and the like.

While I prefer to extract the straw with water, other liquid extracting media may be employed. The extraction is performed by heating the straw with the water, and often to attain the required high temperatures, the extraction is performed in a closed vessel at superatmospheric pressure. After extraction is completed, the liquor is separated from the straw by filtration or decantation, and the liquor is then concentrated by evaporation to the desired degree.

The straw extract may be employed as the sole dispersing or colloidal agent, but if desired it may be used in conjunction with other dispersing agents. Examples of such other dispersing agents are bentonite or other colloidal clays; fatty acids such as oleic, stearic or palmitic acids or their salts; the alkali or ammonium salts of sulfo-resinoleic acid or other sulfonated oils; Twitchell's reagents, resin soaps and the like.

While the straw extract may be employed for dispersing finely divided solids of all kinds, such as pigments like graphite, etc., it is particularly useful for the forming of dispersions of water insoluble or relatively low soluble organic compounds capable of coloring cellulose acetate or other organic derivatives of cellulose. Examples of such relatively insoluble dyestuffs for organic derivatives of cellulose are the following: unsulfonated or relatively water insoluble amino-azobenzene substituents, benzene-azo-naphthalamines and their derivatives, naphthalene-azoanilines and their derivatives, amino-azo-naphthalenes and their derivatives, as described in the U. S. patent to G. H. Ellis, 1,618,413 issued February 22, 1927; unsulfonated nitro derivatives of diaryl amines as described in the patents to G. H. Ellis No. 1,618,415 of February 22, 1927 and 1,679,935 of August 7, 1928; unreduced vat dyestuffs of the anthraquinone series, as described in the patent to Ellis 1,641,965 of Sept. 13, 1927; and unsulfonated stilbene compounds as described in the patent to Ellis 1,694,414 of Dec. 11, 1928.

Obviously these compounds are given merely by way of illustration, since the straw extract may be used in connection with any similar relatively water insoluble compound.

In the preparation of the colloidal dispersion, the straw extract is rubbed or ground with the relatively water insoluble organic compounds capable of coloring cellulose acetate or other organic derivatives of cellulose to form a cream or paste. This paste may be employed as a dyestuff either in conjunction with a printing paste, or diluted to form a dye bath. In forming the dye bath the paste may be diluted with water which may contain assistants such as soaps or Turkey Red Oil to form a dye bath in which textile materials, such as yarns or woven or knitted fabrics containing filaments of organic derivatives of cellulose, may be dyed.

As stated this invention is of particular importance in the preparation of dyestuffs for the dyeing or otherwise coloring of materials containing organic derivatives of cellulose such as organic esters of cellulose and cellulose ethers. Examples of such organic esters of cellulose are cellulose acetate, cellulose formate, cellulose propionate and cellulose butyrate, and examples of cellulose ethers are ethyl cellulose, methyl cellulose and benzyl cellulose.

In order further to illustrate my invention the following specific example is given.

Example

The extract is prepared by digesting 2 parts by weight of rye straw with 7 parts by weight of water in a closed digester which is raised to such a temperature that a pressure of 100 lbs. per square inch is developed. The time of digestion is 2½ hours. The straw is separated from the extract by filtration under pressure and the extract is evaporated down to a thick brown mass containing about 50% by weight of solids.

In order to prepare a dye capable of coloring cellulose acetate material blue, one part by weight of 1.4 dimethyldiamino anthraquinone, 2 parts of the straw extract and 2 parts of water are rubbed or ground in a ball mill until a perfectly smooth paste or cream is formed. 1 part by weight of this paste or cream is then added to 100 parts of an aqueous solution containing 20 grams per litre of Turkey Red Oil, 10 grams per litre of soap and 0.2 grams per litre of soda ash. The solution thus formed is an excellent dye bath for coloring cellulose acetate textile materials.

It is to be understood that the foregoing detailed description is given merely by way of illustration and that many variations may be made therein without departing from the spirit of my invention.

Having described my invention, what I desire to secure by Letters Patent is:

1. Dyestuffs capable of coloring organic derivative of cellulose material comprising a finely divided relatively water insoluble organic compound capable of coloring organic derivatives of cellulose dispersed by the aid of an extract of straw.

2. Dyestuffs capable of coloring cellulose acetate material comprising a finely divided relatively water insoluble organic compound capable of coloring cellulose acetate dispersed by the aid of an extract of straw.

3. Dyestuffs capable of coloring cellulose acetate material comprising a finely divided relatively water insoluble organic compound capable of coloring cellulose acetate dispersed by the aid of an aqueous extract of straw.

4. Dyestuffs capable of coloring cellulose acetate material comprising a finely divided relatively water insoluble organic compound capable of coloring cellulose acetate dispersed by the aid of an aqueous extract of straw and another dispersing agent.

5. Dyestuffs capable of coloring cellulose acetate material comprising a finely divided relatively water insoluble organic compound capable of coloring cellulose acetate dispersed by the aid of an aqueous extract of straw and bentonite.

6. Method of coloring organic derivative of cellulose material comprising applying thereto a relatively water insoluble organic compound capable of coloring organic derivatives of cellulose dispersed by the aid of an extract of straw.

7. Method of coloring cellulose acetate material comprising applying thereto a relatively water insoluble organic compound capable of coloring cellulose acetate dispersed by the aid of an extract of straw.

GEORGE W. MILES.